UNITED STATES PATENT OFFICE.

FRED BEDFORD, OF SLEAFORD, ENGLAND, AND ERNST ERDMANN, OF HALLE-ON-THE-SAALE, GERMANY, ASSIGNORS, BY MESNE ASSIGNMENTS, TO THE HYDROGENATION COMPANY, OF CINCINNATI, OHIO, A CORPORATION OF OHIO.

PROCESS FOR THE PRODUCTION OF LIGHT VOLUMINOUS OXIDS SPECIALLY SUITABLE FOR CATALYTIC REACTIONS.

1,200,696.     Specification of Letters Patent.     Patented Oct. 10, 1916.

No Drawing.     Application filed November 12, 1912.  Serial No. 730,968.

*To all whom it may concern:*

Be it known that we, FRED BEDFORD, a subject of the King of Great Britain and Ireland, and ERNST ERDMANN, a subject of the Emperor of Germany, residing at Sleaford, in the county of Lincoln, England, and Margaretenstrasse 1, Halle-on-the-Saale, Germany, respectively, have invented certain new and useful Improvements in Processes for the Production of Light Voluminous Oxids Specially Suitable for Catalytic Reactions, of which the following is a specification.

This invention relates to the preparation of light voluminous metallic oxids such as are specially suitable for catalytic reactions and has for its object to devise a process according to which the metallic oxid is produced in a form in which it is found to be an extremely efficient catalyst.

It is well known that in the case of metallic catalyzers, for example, nickel, cobalt, iron and copper, the state of fine division has a great influence upon the catalytic activity, and the same is also true of the oxids, the degree of catalytic activity of which depends not only upon the chemical quality of the oxid but also essentially upon its physical properties.

We have found that metallic oxids can be produced in an extremely finely divided and voluminous form by preparing a concentrated aqueous solution of a nitrate, mixing the same with an organic compound, preferably one which is soluble in water and rich in carbon and subsequently decomposing by heat. A strong evolution of gas takes place during the combustion of the organic substance with the nitrate whereby the metallic oxid swells up to a large volume and assumes the form of a dust while the whole of the carbon present in the organic compound is removed by the combustion. On reducing with hydrogen at a high temperature, preferably 200 to 300 degrees, the metallic oxids prepared according to our invention can be converted into the corresponding voluminous and catalytically active metals, which are more efficient than catalytic metals prepared by known processes.

Example: Nitric acid of specific gravity of 1.42 is diluted with an equal volume of water and to the diluted acid pure metallic nickel is added. When the resulting reaction is completed the whole is heated to boiling for about two hours in the presence of an excess of nickel in order to neutralize completely the nitric acid present and to precipitate any iron which may occur as hydrated oxid of iron. The clarified nickel nitrate solution is evaporated until its specific gravity is 1.6 and for each liter of this liquid (corresponding to 250 grams of nickel) are stirred in 180 grams of powdered cane sugar. This solution is run in portions into a muffle of any suitable construction heated to a dull red heat and the heating of each portion is continued until no more fumes escape. The voluminous nickel oxid thus formed is removed from the muffle by means of a scraper and a fresh portion of the solution run in.

By means of the process, according to our invention, cobalt oxid, iron oxid and other oxids of the heavy metals which may be used for catalytic purposes, can be produced in a light voluminous and catalytically active form and are extremely well adapted both in the form of oxid and in the form of metal for the process of adding hydrogen to unsaturated organic compounds.

We do not desire to confine our invention to any particular method of heating the metallic nitrate solution and organic compound, nor is the invention to be limited to the exact proportions hereinbefore given by way of example nor to any particular organic compound with which the metallic nitrate solution is to be heated as we may employ other forms of sugar or starch, dextrin, gum arabic, tartaric acid or other suitable organic substances, but preferably such as are soluble in water and rich in carbon.

What we claim as our invention and desire to secure by Letters Patent is:—

1. A process of preparing finely-divided heavy metal oxids suitable for use as catalysts, which consists in mixing the nitrate of a heavy metal, in concentrated solution and without admixture with other salts of the said metal, with an organic substance soluble in water and rich in carbon, and subsequently completely decomposing the organic substance by heat, whereby the heavy metal oxid is obtained in a state of extreme subdivision.

2. A process for the preparation of very voluminous and light metallic oxids particularly suitable for catalytic reactions which consists in mixing the nitrate of the metal whose oxid is to be produced without admixture of other salts in concentrated solution with an organic compound soluble in water and rich in carbon, and subsequently running such solution in small portions at a time into a muffle heated to a dull red heat, the heating of each portion being continued until complete combustion has taken place, whereby at the end of the process there remains only a metal oxid in an extremely fine state of division.

In testimony whereof, we affix our signatures in presence of two witnesses.

FRED BEDFORD.
ERNST ERDMANN.

Witnesses to signature of Fred Bedford:
P. A. OUTHWAITE,
J. PHILLIPS CRAWLEY.

Witnesses to signature of Ernst Erdmann:
RUDOLPH FRICKE,
DORIS KRAHL.